(12) United States Patent
Oishi

(10) Patent No.: US 7,881,271 B2
(45) Date of Patent: Feb. 1, 2011

(54) WIRELESS LAN SYSTEM AND ITS BROADCASTING STATION

(75) Inventor: Hirokazu Oishi, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 489 days.

(21) Appl. No.: 11/910,035

(22) PCT Filed: Mar. 30, 2006

(86) PCT No.: PCT/JP2006/306724

§ 371 (c)(1),
(2), (4) Date: Jan. 2, 2008

(87) PCT Pub. No.: WO2006/106861

PCT Pub. Date: Oct. 12, 2006

(65) Prior Publication Data

US 2008/0219226 A1    Sep. 11, 2008

(30) Foreign Application Priority Data

Mar. 31, 2005    (JP) .............................. 2005-104273

(51) Int. Cl.
*H04Q 7/24* (2006.01)
*H04W 72/00* (2009.01)
(52) U.S. Cl. ...................................... 370/338; 455/450
(58) Field of Classification Search ....................... None
See application file for complete search history.

(56) References Cited

U.S. PATENT DOCUMENTS

| | | | | |
|---|---|---|---|---|
| 7,290,195 B2 * | 10/2007 | Guo et al. | .................... | 714/749 |
| 2005/0226273 A1 * | 10/2005 | Qian | .......................... | 370/474 |
| 2005/0265297 A1 * | 12/2005 | Nakajima et al. | ............ | 370/338 |
| 2006/0050709 A1 * | 3/2006 | Sung et al. | ................... | 370/394 |
| 2006/0050742 A1 * | 3/2006 | Grandhi et al. | ............. | 370/506 |
| 2006/0057968 A1 | 3/2006 | Ohtani | | |

(Continued)

FOREIGN PATENT DOCUMENTS

JP    2003-503948 A    1/2003

(Continued)

OTHER PUBLICATIONS

Carlos Rios (Riostek LLC), "IEEE P802.11 Wireless LANs, Proposed Modifications to the 802.11e-D4.0, Group Ack Specification", IEEE 802.11-03/052r0, 2003, pp. 1-16.

*Primary Examiner*—Pankaj Kumar
*Assistant Examiner*—Eunsook Choi
(74) *Attorney, Agent, or Firm*—Foley & Lardner LLP

(57) ABSTRACT

In a wireless LAN system according to the present invention, when a first communication station transmits packets to a second communication station, the first communication station can select a first method in which the second communication station returns first transmission-confirmation information to the first communication station for each packet that the second communication station receives, and a second method in which the second communication station returns, in response to the request of the first communication station, second transmission-confirmation information to the first communication station for plural received packets. The first communication station selects either one of the first method and the second method, based on a number k of packets to be acknowledged by the second transmission-confirmation information. With this arrangement, in the wireless LAN system capable of using plural kinds of transmission confirmation information, transmission confirmation information capable of improving transmission efficiency is selected.

4 Claims, 9 Drawing Sheets

U.S. PATENT DOCUMENTS

| | | | |
|---|---|---|---|
| 2006/0077942 A1 * | 4/2006 | Panwar et al. | 370/338 |
| 2006/0146764 A1 | 7/2006 | Takemoto et al. | |
| 2007/0160021 A1 * | 7/2007 | Xhafa et al. | 370/338 |
| 2008/0192689 A1 * | 8/2008 | Kim et al. | 370/329 |
| 2008/0298306 A1 * | 12/2008 | Larsson | 370/328 |
| 2009/0247089 A1 * | 10/2009 | Budde et al. | 455/69 |

FOREIGN PATENT DOCUMENTS

| | | |
|---|---|---|
| WO | WO 01/03359 A1 | 1/2001 |
| WO | WO 2004/039009 A1 | 5/2004 |
| WO | WO 2004/047376 A1 | 6/2004 |

* cited by examiner

WHEN Block ACK IS USED

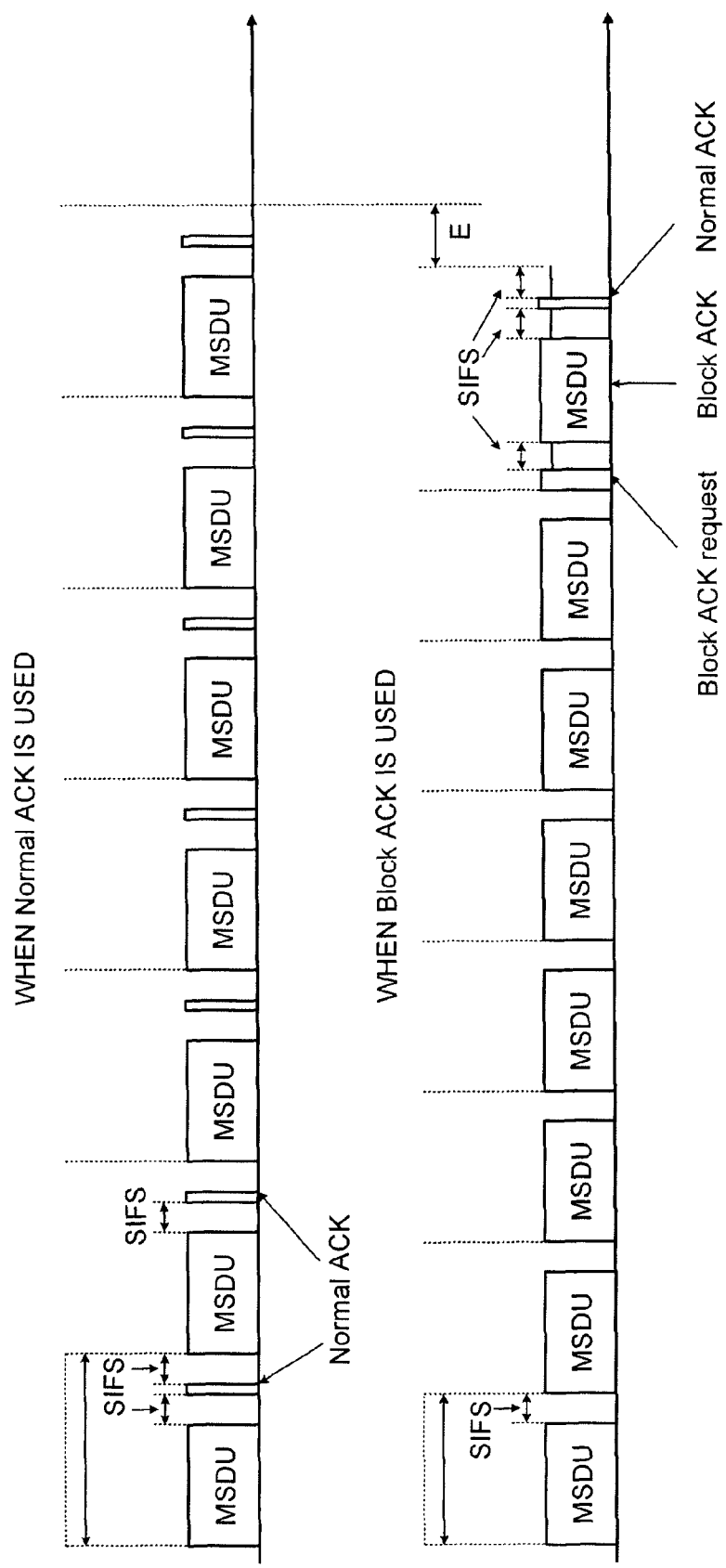

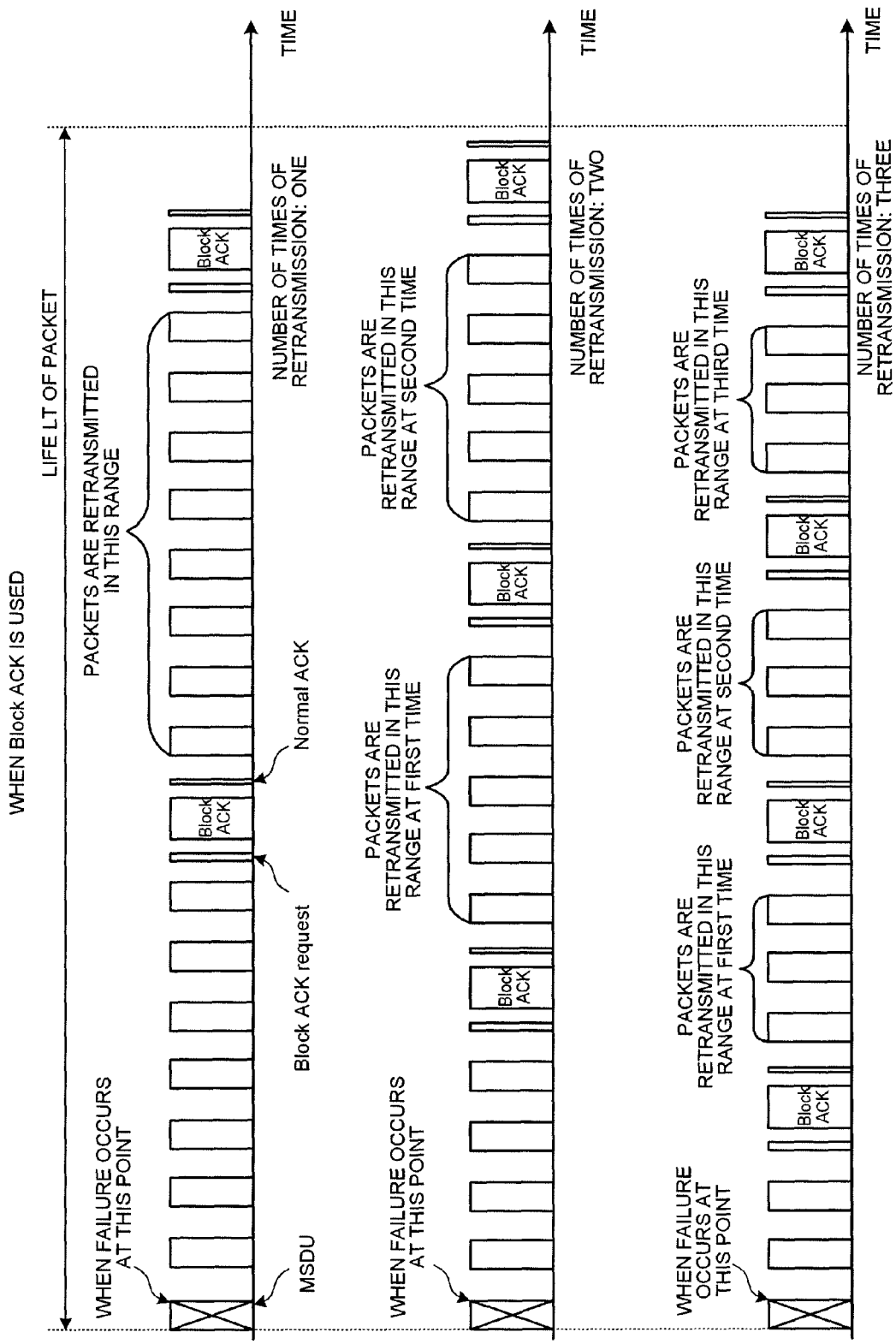

WIRELESS LAN SYSTEM AND ITS BROADCASTING STATION

TECHNICAL FIELD

The present invention relates to a wireless LAN system and its transmitting station, and, more particularly to a wireless LAN system and its transmitting station capable of selecting both a first method and a second method, when a first communication station transmits packets to a second communication station, the first method enabling the second communication station to return first transmission-confirmation information to the first communication station about each of the packets that the second communication station receives, and the second method enabling the second communication station to return second transmission-confirmation information to the first communication station about the received plural packets at the request of the first communication station.

BACKGROUND ART

Conventionally, in the computer network, packet transmission and reception are carried out using a communication system called a packet communication system. Recently, demand for establishing a network using wireless communication is increasing in a household LAN (Local Area Network), for example. As compared with a wired LAN, the wireless LAN has such advantages that the installation of a wire such as a cable is not necessary and that the degree of freedom of moving a terminal connected to the LAN increases.

The IEEE802.11 radio communication system (a system based on the ANSI/IEEE Std 802.11, 1999 Edition) is present as a standard wireless LAN. The standard of the IEEE802.11 is further divided into details according to frequencies band and communication speeds used.

In the network such as the wireless LAN, plural communication devices connected to the network share one network route in time sharing, regarding transmission and reception of packets. The efficiency of band utilization changes greatly depending on managing methods of transmission right.

For example, when carrying out transmission and reception of motion data such as video data in streaming via the wireless LAN, occurrence of frame dropping, fuzzy images, and voice interruption is considered at the reception side, unless the transmission right is managed accurately. Accordingly, the IEEE802.11e is proposed as the standard which takes QoS (Quality Of Service) into consideration (see, for example, Nonpatent Literature 1).

The IEEE802.11e prescribes provision of a control station that manages the transmission right, within a specific communication network. Within the communication network, the control station carries out scheduling to give the transmission right to each transmitting station, considering transmission requests from plural transmitting stations that are going to transmit data. The control station transmits a packet called Qos CF-PLL, indicating provision of the transmission right, to each transmitting station, based on this scheduling. The transmitting station is permitted to transmit data only when the transmitting station is given the Qos CF-POLL from the control station, and can transmit the data only during a period called TXOP indicated by Qos CF-POLL.

As described above, because each transmitting station is given the transmission right following the scheduling of the control station, the transmitting station can use a communication band more properly corresponding to urgency of data transmission.

In the above communication network, when the transmitting station transmits data to the receiving station, the receiving station sometimes cannot properly receive the transmitted data for some reason. This problem becomes notable in wireless communication. Therefore, when the transmitting station transmits data to the receiving station, and also when the receiving station accurately receives this data, the receiving station transmits transmission confirmation information to the transmitting station. Upon receiving the transmission confirmation information, the transmitting station specifies a packet of which transmission has been unsuccessful, from the content of the transmission confirmation information. The transmitting station retransmits this packet. With this process, all packets are substantially securely transmitted to the receiving station.

The IEEE802.11e employs a system of using Block ACK for acknowledging plural packets, in addition to conventional Normal ACK for acknowledging individual packets, as kinds of ACK, to decrease the number of occupied bands. Specifically, when the transmitting station transmits a packet called Block ACK Request to the receiving station, and also when the receiving station receives this packet, the receiving station transmits to the transmitting station a packet called Block ACK containing a bit map indicating the transmission confirmation of a predetermined number of packets that the receiving station has received from the transmitting station. The transmitting station retransmits the packets based on the transmission confirmation information indicated by Block ACK. In general, the use of Block ACK improves the using efficiency of bands, as compared with when the conventional Normal ACK is used.

Nonpatent Literature 1: http://www.ili-info.com/ieee802drafts/2005.3.31

DISCLOSURE OF INVENTION

Problem to be Solved by the Invention

The IEEE802.11e leaves it to user determination whether Block ACK is used or Normal ACK is used as transmission confirmation information, and does not prescribe a using standard. The use of Block ACK does not always guarantee the improvement of transmission efficiency. Transmission efficiency is different depending on the communication environment in which either one of Block ACK and Normal ACK is used.

The present invention has an object of providing a wireless LAN system and its transmitting station capable of selecting transmission confirmation information capable of improving transmission efficiency, in the wireless LAN system that can use plural kinds of transmission confirmation information.

Means for Solving Problem

To solve the problems described above and achieve the object, according to an aspect of the invention, in a wireless LAN system established by connecting a plurality of communication stations via a network, a first communication station, when the first communication station transmits packets to a second communication station, can select a first method in which the second communication station returns first transmission-confirmation information to the first communication station for each packet that the second communication station receives, and a second method in which the second communication station returns, in response to the request of the first communication station, second transmission-confirmation information to the first communication station for a plurality of received packets, and the first communication station can select either one of the first method and the second method, based on a number k of packets to be acknowledged by the second transmission-confirmation information.

According to another aspect of the invention, in a transmitting station in a wireless LAN system established by connecting a plurality of communication stations connected via a network, the transmitting station, when the transmitting station transmits packets to a receiving station, can select a first method in which the receiving station returns first transmission-confirmation information to the transmitting station for each packet that the receiving station receives, and a second method in which the receiving station returns, in response to the request of the transmitting station, second transmission-confirmation information to the transmitting station for a plurality of received packets, and the transmitting station can select either one of the first method and the second method, based on a number k of packets to be acknowledged by the second transmission-confirmation information.

BRIEF DESCRIPTION OF DRAWINGS

FIG. 6B is an explanatory diagram (part 2) of a comparison between data transmission efficiency when Block ACK is used and data transmission efficiency when Normal ACK is used.

FIG. 9 is a diagram for explaining a relationship between the number of times of retransmission when Block ACK is used and data transmission efficiency.

EXPLANATIONS OF LETTERS OR NUMERALS

Figure 1:
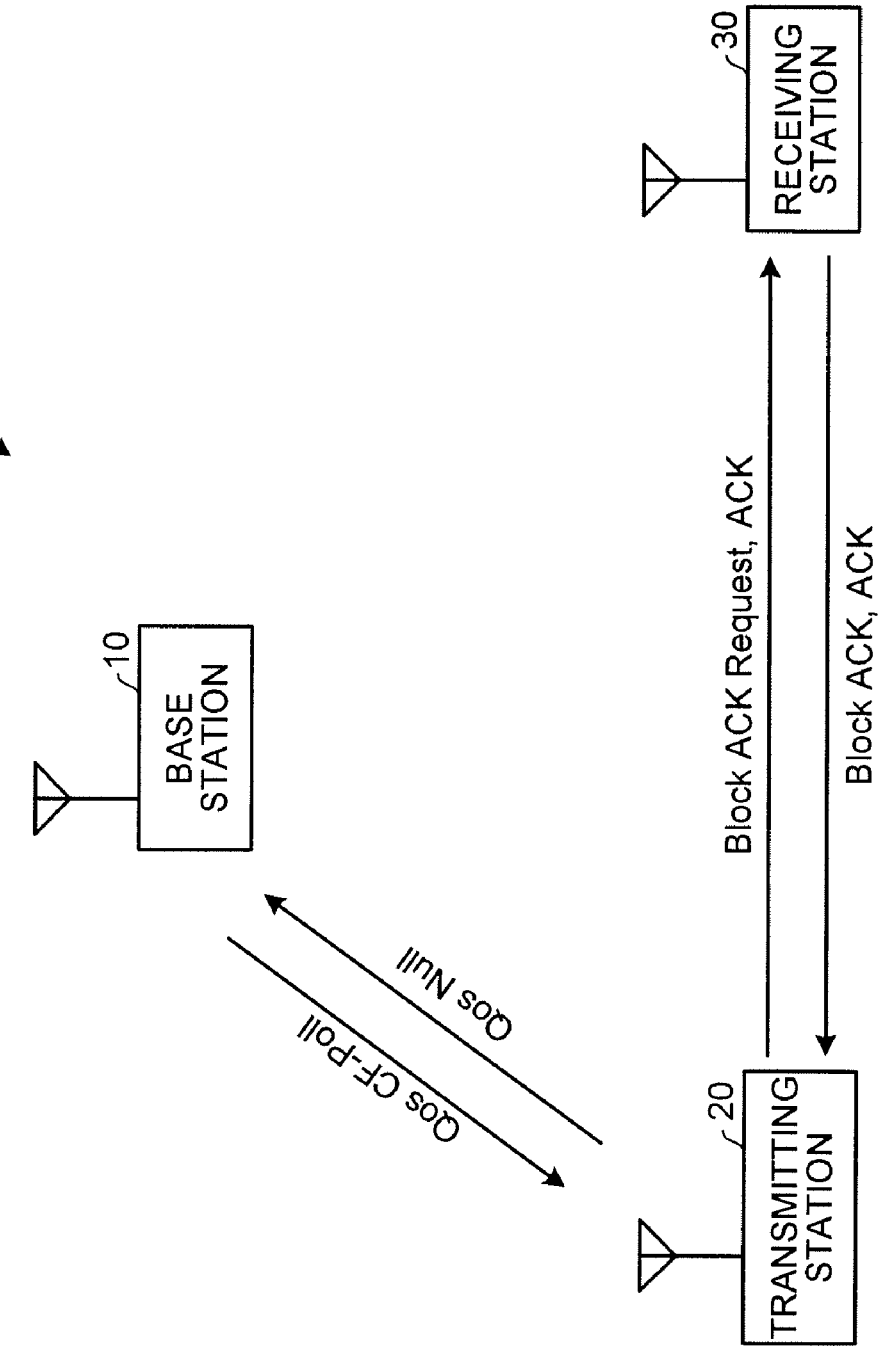
FIG. 1 is a diagram for illustrating a configuration example of a wireless LAN system according to an embodiment of the present invention.

1 Wireless LAN system
10 Base station
20 Transmitting station
21 Antenna
22 Receiving unit
23 Transmitting unit
24 ACK analyzing unit
25 Transmission-data managing unit
26 Transmission controller
27 Acknowledgement-type determining unit
28 Transmission buffer
30 Receiving station
31 Antenna
32 Receiving unit
33 Transmitting unit
34 Reception controller
35 Reception-data managing unit
36 ACK transmission controller
37 Receiving buffer

BEST MODE(S) FOR CARRYING OUT THE INVENTION

Exemplary embodiments of the present invention will be explained below in detail. Note that the embodiments do not limit the present invention, and not all combinations of characteristics explained in the embodiments are necessary for solving means of the invention. Constituent elements of the following embodiments include ones persons skilled in the art can easily achieve or substantially identical elements.

FIG. 1 is a diagram for illustrating a configuration example of a wireless LAN system 1 according to an embodiment. The wireless LAN system 1 shown in FIG. 1 has a configuration based on the IEEE802.11e. As shown in FIG. 1, the wireless LAN system 1 includes a base station (AP) 10, a transmitting station (STA) 20 as a communication station at the data transmission side, and a receiving station (STA) 30 as a communication station at the data reception side.

To simplify the explanation, FIG. 1 depicts an example that a network system includes one transmitting station and one receiving station. However, the network system actually includes plural transmitting stations and plural receiving stations. While the transmitting station and the receiving station are distinguished, the transmitting station can also become a receiving station, and the receiving station can also becomes a transmitting station. The base station 10, the transmitting station 20, and the receiving station 30 are connected to each other to be able to carry out wireless communication, and belong to the same communication network. An infrastructure mode, an ad hoc mode, and Direct Link are used for data communications between the transmitting station 20 and the receiving station 30.

In this wireless LAN system 1, the base station 10 carries out scheduling to give the transmission right to each transmitting station 20 by taking into account transmission requests from the plural transmitting stations 20. Based on this scheduling, the base station 10 transmits a packet called Qos CF-POLL indicating provision of the transmission right, to each transmitting station 20. Qos CF-POLL contains information of a period (TXOP (Transmission Opportunity)) called TXOP LIMIT during which the transmission right is provided. The transmitting station 20 to which Qos CF-POLL is destined is permitted to transmit data during this TXOP period.

The transmitting station 20 transmits data during the TXOP period. When Block ACK is used, the transmitting station 20 transmits a series of data packets to the receiving station 30, and transmits Block ACK Request to the receiving station 30 at a predetermined timing. When the receiving station 30 receives Block ACK Request from the transmitting station 20, the transmitting station 20 transmits Block ACK in response to the received Block ACK Request. Upon receiving Block ACK, the transmitting station 20 transmits ACK to the receiving station 30 to confirm the reception of Block ACK. Block ACK contains a bit map indicating the transmission confirmation of a predetermined number of packets received from the transmitting station 20. The transmitting station 20 retransmits the packets based on the transmission confirmation information indicated by Block ACK. On the other hand, when Normal ACK is used, the transmitting station 20 transmits a data packet to the receiving station 30. Each time when the receiving station 30 receives a data packet, the receiving station 30 transmits ACK to the transmitting station 20 in response to the received data packet.

The transmitting station 20 transmits a packet called QoS Null to the base station 10, at the point of time when the scheduled data transmission ends during the TXOP period. QoS Null contains information concerning a quantity of data not yet transmitted and remaining in the transmission buffer of the transmitting station 20, or information concerning time required for the transmission of the data not yet transmitted. The base station 10 receives this QoS Null from each transmitting station 20, thereby understanding the transmission state in each transmitting station 20, and carries out the scheduling based on the received transmission state.

Figure 2:
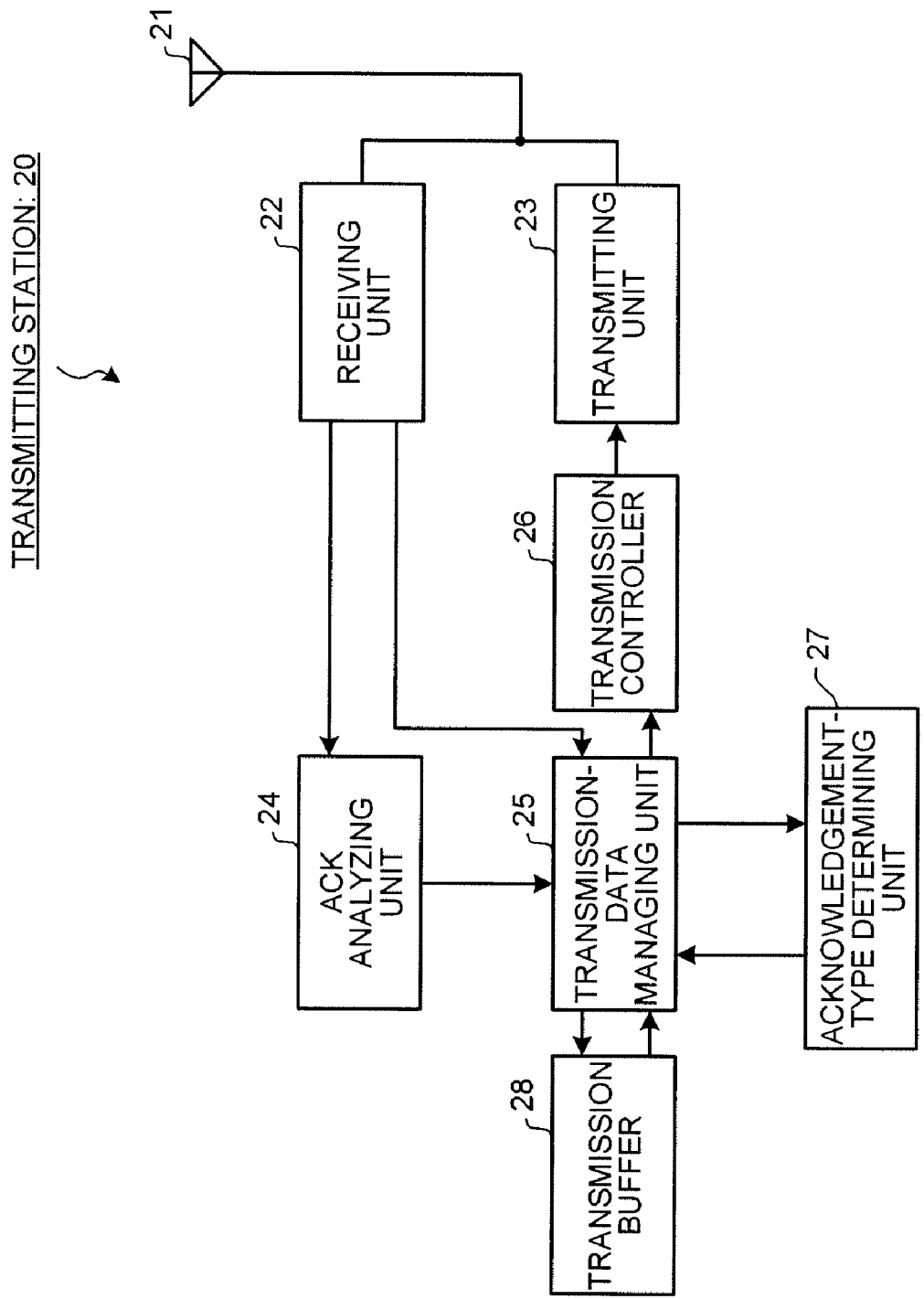
FIG. 2 is a diagram for illustrating a schematic configuration of a transmitting station in FIG. 1.

FIG. 2 is a diagram for illustrating a schematic configuration of the transmitting station 20. As shown in FIG. 2, the transmitting station 20 includes an antenna 21, a transmitting unit 23, a receiving unit 22, an ACK analyzing unit 24, a transmission-data managing unit 25, a transmission controller 26, an acknowledgement-type determining unit 27, and a transmission buffer 28.

The transmitting unit 23 transmits data such as stream data to be transmitted, and Block ACK Request, and ACK, to the receiving station 30, and transmits QoS Null to the base station 10. The receiving unit 22 receives Block ACK and ACK from the receiving station 30, and receives Qos CF-POLL and the like from the base station 10.

The ACK analyzing unit 24 searches a packet to be retransmitted, based on Block ACK and ACK received from the receiving station 30, notifies the transmission-data managing unit 25 about this packet, and updates the content to be notified in QoS Null.

The transmission controller 26 generates a frame after carrying out an encoding such as an error correction to the data delivered from the transmission-data managing unit 25, and transmits this frame to the transmitting unit 23.

The acknowledgement-type determining unit 27 selects either Block ACK (second transmission-confirmation information) or Normal ACK (first transmission-confirmation information) to be used, based on a number k of packets to be acknowledged based on Block ACK, and notifies the transmission-data managing unit 25 about the selected result. In this case, k can be calculated using a bit error rate, a packet size, and time for guaranteeing error free as a parameter.

The transmission-data managing unit 25 manages the TXOP period based on Qos CF-POLL received from the base station 10, selects any one of a retransmission process, a new-stream data transmission process, an acknowledgement transmission process of transmitting Block ACK Request, and Qos Null transmission process, corresponding to a remaining time, requests the transmission buffer 28 corresponding data, and transmits extracted data to the transmission controller 26. When the acknowledgement-type determining unit 27 selects Block ACK, the transmission-data managing unit 25 transmits Block ACK Request. The transmission buffer 28 functions as a buffer to temporarily store data to be transmitted.

Figure 3:
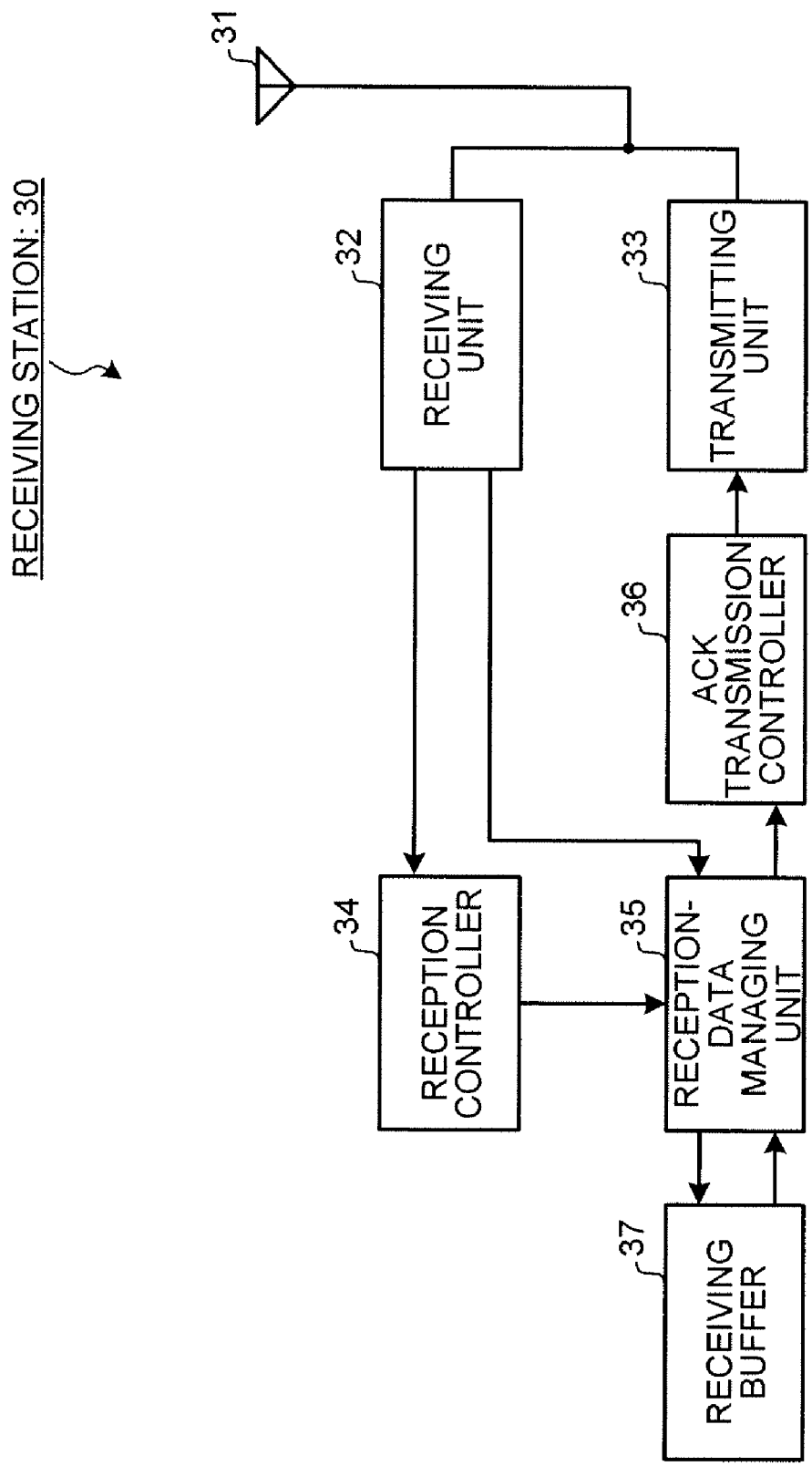
FIG. 3 is a diagram for illustrating a schematic configuration of a receiving station in FIG. 1.

FIG. 3 is a diagram for illustrating a schematic configuration of the receiving station 30. As shown in FIG. 3, the receiving station 30 includes an antenna 31, a receiving unit 32, a transmitting unit 33, a reception controller 34, a reception-data managing unit 35, an ACK transmission controller 36, and a receiving buffer 37.

The transmitting unit 33 transmits Block ACK and ACK to the transmitting station 20. The receiving unit 32 receives reception data such as stream data, and Block ACK Request, and ACK, from the transmitting station 20.

The reception controller 34 is a block that decodes error correction of reception data such as stream data that the receiving unit 32 receives, and transmits the decoded data to the reception-data managing unit 35.

The reception-data managing unit 35 stores data delivered from the reception controller 34 into the receiving buffer 37, carries out a transmission confirmation based on the request of Block ACK Request received from the transmitting station 20, generates Block ACK information and Normal ACK information, and transmits these pieces of information to the ACK transmission controller 36.

The ACK transmission controller 36 generates frames of Block ACK and Normal ACK based on the information of Block ACK and ACK transmitted from the reception-data managing unit 35, and transmits these frames to the transmitting unit 33. The receiving buffer 37 functions to temporarily store reception data such as stream data input from the reception-data managing unit 13.

Upon receiving Block ACK Request from the transmitting station 20, the receiving station 30 recognizes a packet of which transmission-confirmation information is to be transmitted, generates Block ACK based on this recognition, and, transmits the transmission confirmation information to the transmitting station 20. Upon receiving a packet from the transmitting station 20, the receiving station 30 generates Normal ACK, and transmits this Normal ACK to the transmitting station 20.

Upon receiving Block ACK, the transmitting station 20 recognizes a packet of which transmission-confirmation information has been transmitted, transmits ACK of the reception of Block ACK, recognizes a packet to be retransmitted, and retransmits the packet. Upon receiving ACK, the transmitting station 20 retransmits the packet of which reception has been unsuccessful.

In the wireless LAN system 1 according to the present embodiment, when data is to be transmitted and received between the transmitting station 20 and the receiving station 30, either Block ACK or Normal ACK is used as transmission confirmation information. When necessary, data is retransmitted. In the wireless LAN system 1 according to the present embodiment, either Block ACK or Normal ACK of which data transmission efficiency is better is determined, and transmission confirmation information of better transmission efficiency is used. A detailed example of this determination method is explained below.

(Determination Method 1)

Figure 4:
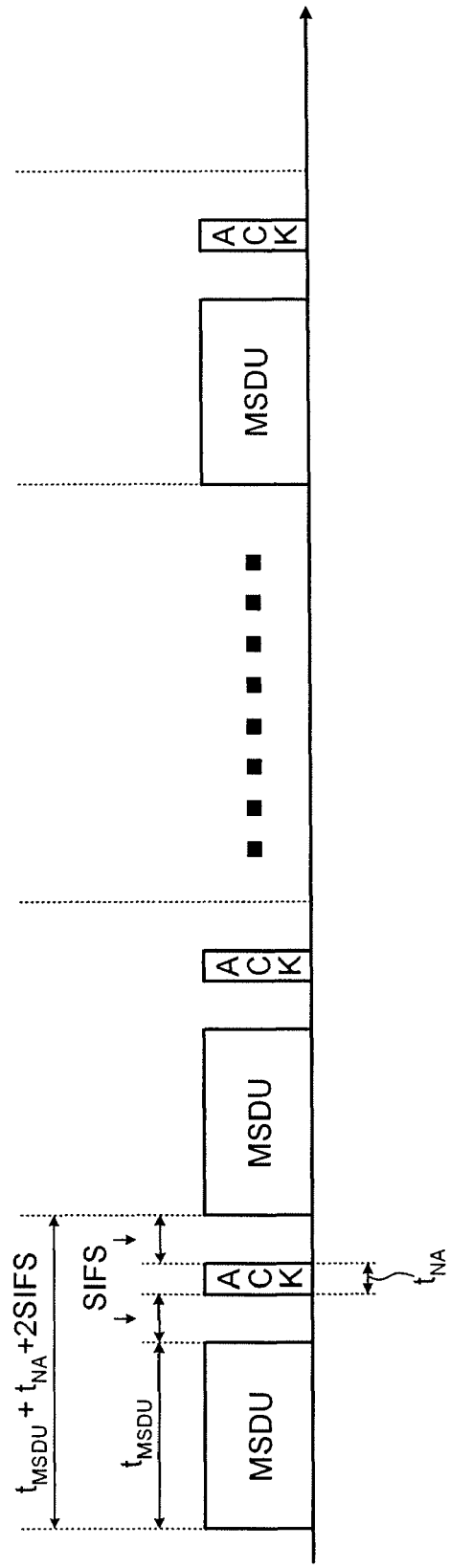
FIG. 4 is a diagram for illustrating one example of a data transmission sequence when Normal ACK is used.

FIG. 4 is a diagram for illustrating one example of a data transmission sequence when Normal ACK is used. In FIG. 4, $t_{MSDU}$ represents a transmission period of MSDU (a packet) $t_{NA}$ represents a transmission period of Normal ACK, and SIFS (Short IFS) represents a short frame interval. When Normal ACK is used, time t1 during which k MSDUs are transmitted becomes $t1=k(t_{MSDU}+t_{NA}+2SIFS)$.

Figure 5:
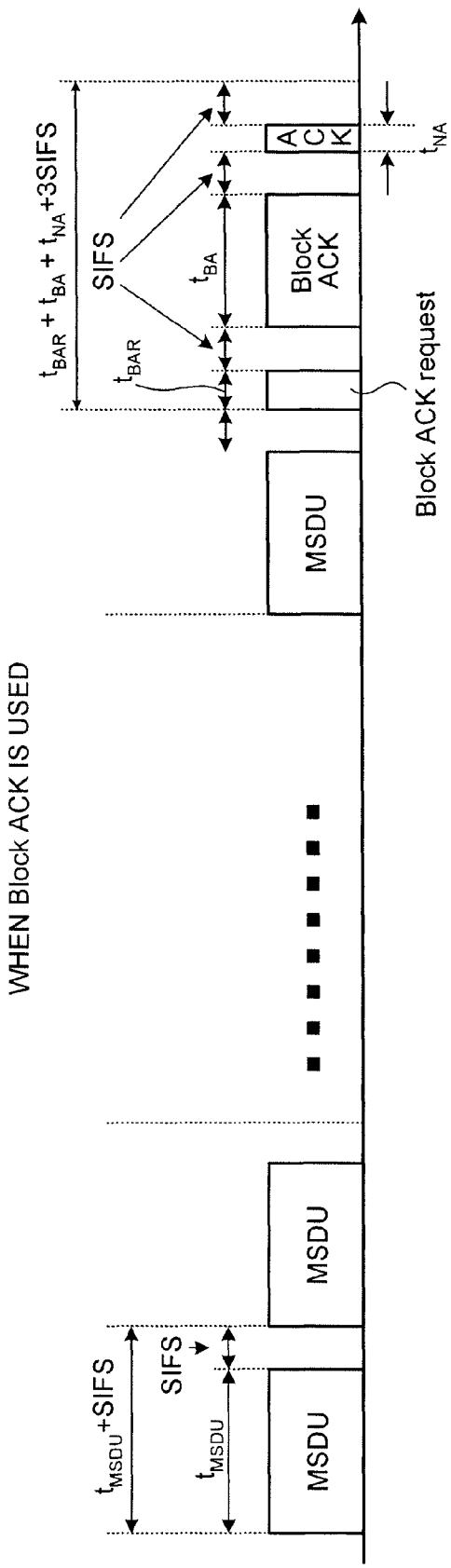
FIG. 5 is a diagram for illustrating one example of a data transmission sequence when Block ACK is used.

FIG. 5 is a diagram for illustrating one example of a data transmission sequence when Block ACK is used. In FIG. 5, $t_{MSDU}$ represents a transmission period of MSDU, $t_{NA}$ represents a transmission period of Normal ACK, SIFS (Short IFS) represents a short frame interval, $t_{BAR}$ represents a transmission period of Block ACK Request, and $t_{BA}$ represents a period of Block ACK. When Block ACK is used, time t2 during which k MSDUs are transmitted becomes $t2=k(t_{MSDU}+SIFS)+(t_{BAR}+t_{BA}+t_{NA}+3SIFS)$.

Figure 6A:
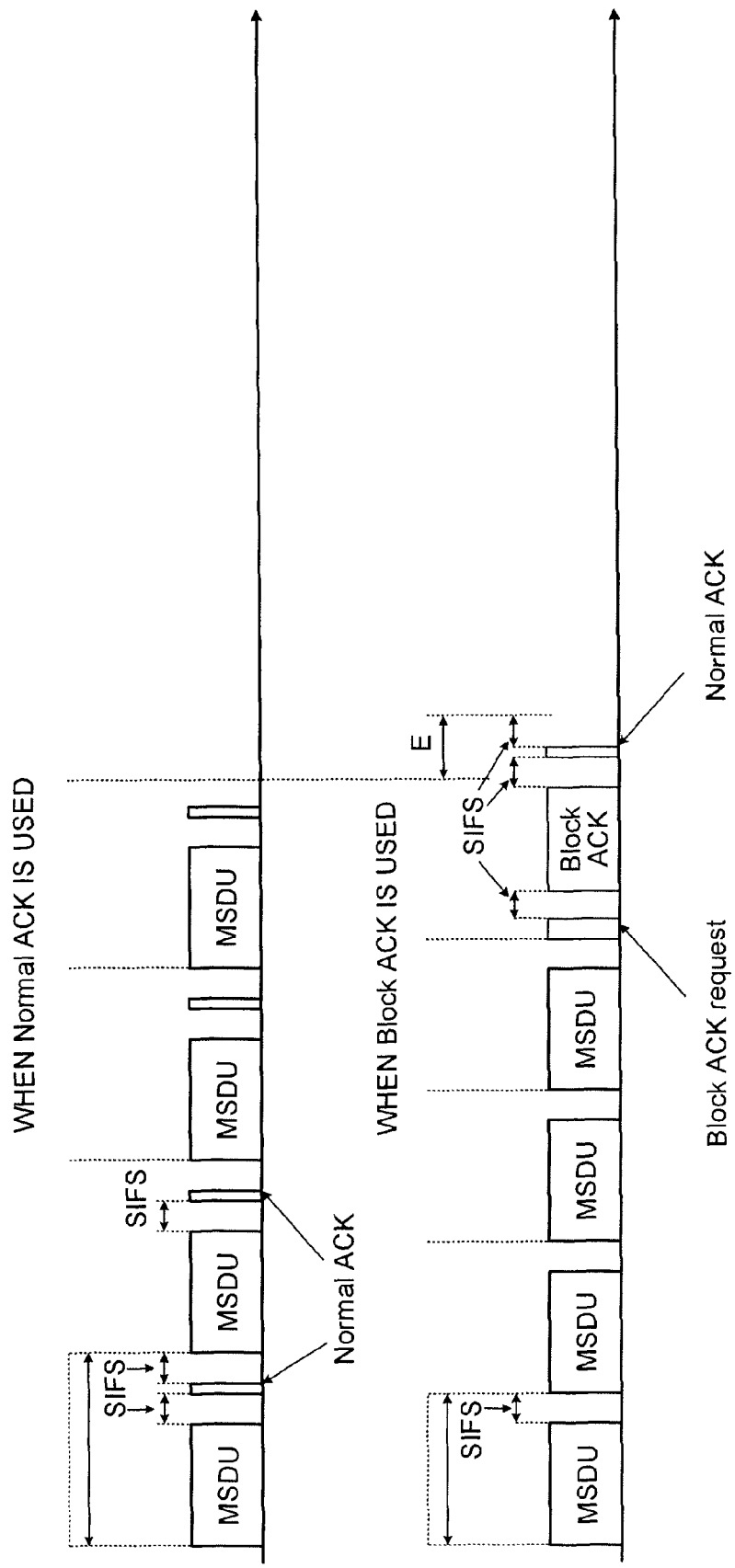
FIG. 6A is an explanatory diagram (part 1) of a comparison between data transmission efficiency when Block ACK is used and data transmission efficiency when Normal ACK is used.

FIGS. 6A and 6B are explanatory diagrams of a comparison between data transmission efficiency when Block ACK is used and data transmission efficiency when Normal ACK is used. As shown in FIG. 6A, when the number k of packets to be acknowledged by Block ACK is small, the use of Block ACK decreases the using efficiency of the band, thereby decreasing the transmission efficiency by the period of E shown in the drawing. As shown in FIG. 6B, when the number k of packets to be acknowledged by Block ACK is large, the use of Block ACK increases the using efficiency of the band, thereby improving the transmission efficiency by the period E shown in the drawing.

When the number k of packets to be acknowledged by Block ACK is small, many times of retransmission is necessary during a certain period (for example, a life of a packet, during which the packet needs to be transmitted securely). A large number of times of retransmission is necessary when there are many transmission errors.

Because the size of Block ACK is smaller than that of Normal ACK, an efficiency is not improved when the number of packets is small. In the present embodiment, whether Block ACK is to be used is determined by considering the number k of packets to be acknowledged by Block ACK.

Specifically, when time t1 during which k MSDUs are transmitted when Normal ACK is used is larger than time t2 during which k MSDUs are transmitted when Block ACK is used, the use of Block ACK is more efficient. Namely, when $(k-1)t_{NA}+(k-3)SIFS-t_{BAR}-t_{BA}>0$, it is more efficient to user Block ACK. This equation is solved as follows.

$$k(t_{NA}+SIFS)-t_{BAR}-t_{BA}-t_{NA}-3SIFS>0$$

$$k>(t_{BAR}+t_{BA}+t_{NA}+3SIFS)/(t_{NA}+SIFS)$$

In the present embodiment, when $k>(t_{BAR}+t_{BA}+t_{NA}+3SIFS)/(t_{NA}+SIFS)$, Block ACK is used. When $k<(t_{BAR}+t_{BA}+t_{NA}+3SIFS)/(t_{NA}+SIFS)$, Normal ACK is used. When $k=(t_{BAR}+t_{BA}+t_{NA}+3SIFS)/(t_{NA}+SIFS)$, either Block ACK or Normal ACK can be used.

Specifically, in the transmitting station 20, the acknowledgement-type determining unit 27 determines whether $k>(t_{BAR}+t_{BA}+t_{NA}+3SIFS)/(t_{NA}+SIFS)$. When $k>(t_{BAR}+t_{BA}+t_{NA}+3SIFS)/(t_{NA}+SIFS)$, the acknowledgement-type determining unit 27 selects Block ACK, and the transmission-data managing unit 25 transmits Block ACK Request.

(Determination Method 2)

Usually, a reception side of an AV transmitter using wireless includes a buffer to respond to a transmission jitter or a retransmission waiting. Because the AV data is timely continuous, continuous packets must reach before causing a buffer underflow. For example, when buffer capacity=B, a transmission rate=R, and a packet life (an effective period)=LT, the packet life (the effective period) LT becomes substantially equal to B/R.

To securely transmit packets during the packet life (the effective period) LT, transmission scheduling needs to be set such that the number of times of retransmission is increased. A large number of times of retransmission needs to be set, when a transmission error becomes large due to the environment of much noise or a large packet size.

As described above, the packet error rate increases or decreases depending on the size of packet size. When a bit error rate=q, a packet size=s[bit], and a packet error rate=Per, this Per becomes equal to $1-(1-q)^s$. Because $0<1-q<1$, the packet error rate Per becomes large when the packet size S becomes large.

Figure 7:
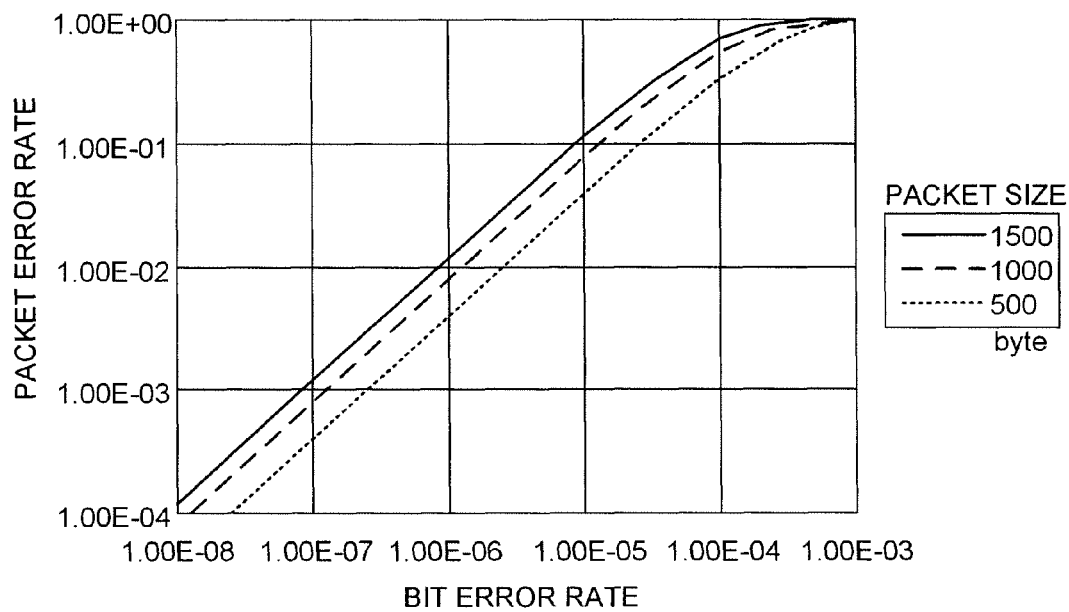
FIG. 7 is a diagram for illustrating a relationship between a bit error rate and a packet error rate for each packet size.
Figure 8:
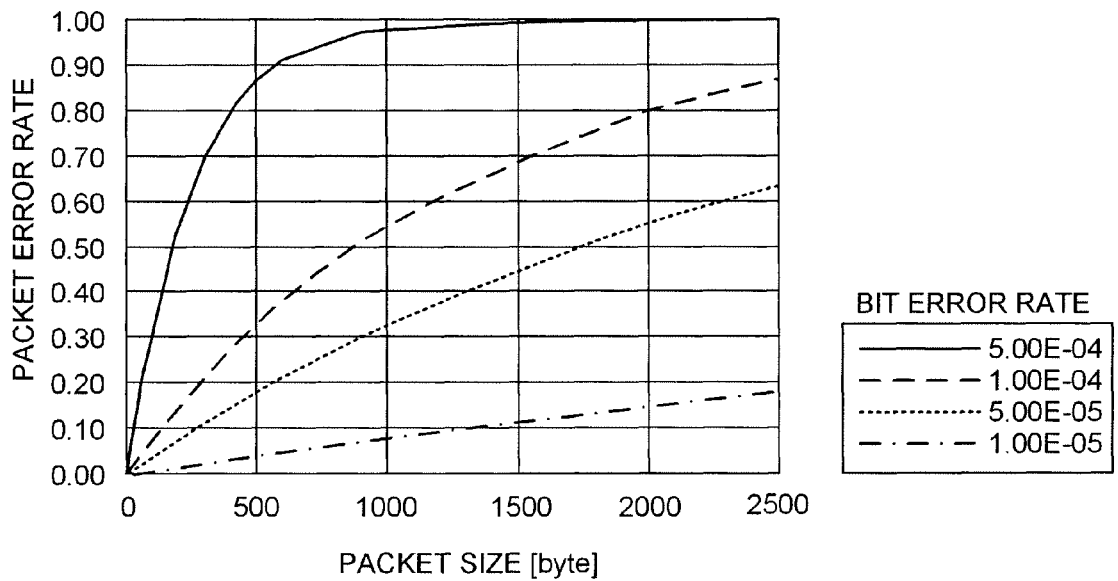
FIG. 8 is a diagram for illustrating a relationship between a packet size and a packet error rate for each bit error rate.

FIG. 7 is a diagram for illustrating a relationship between a bit error rate and a packet error rate for each packet size. In FIG. 7, the horizontal axis represents a bit error rate, and the vertical axis represents a packet error rate. FIG. 8 is a diagram for illustrating a relationship between a packet size and a packet error rate for each bit error rate. In FIG. 8, the horizontal axis represents a packet size, and the vertical axis represents a packet error rate.

FIG. 9 is a diagram for explaining a relationship between the number of times of retransmission when Block ACK is used and data transmission efficiency. As shown in FIG. 9, when the number of packets to be acknowledged by Block ACK is decreased (when a large number of times of retransmission is set), the number of times of retransmission increases, but the proportion of Block ACK increases, thereby increasing unnecessary parts.

To guarantee error free of streams of the transmission rate R during the constant time t when the life of MSDU is LT, an error rate q (where $0<q<1$) of MSDU and a number n of times of retransmission can be approximated as $t \times R \times q^n < 1$. Therefore, the following relationship is obtained: $q^n < (1/(t \times R)) \rightarrow n > \log_q(1/(t \times R))$. The number n of times of retransmission can be calculated using the bit error rate, the packet size, and the time for guaranteeing the error free as parameters.

In this case, LT/n becomes the largest time allocated to the one-time transmission when ACK is used. When the number of MSDUs that can be transmitted during this time is smaller than the above k, Normal ACK is used, and when the number of MSDUs that can be transmitted during this time is larger than the above k, Block ACK is used.

In other words, when $\{LT/n-(t_{BAR}+t_{BA}+3SIFS)\}/(t_{NA}+SIFS)<k$, Normal ACK is used. On the other hand, when $\{LT/n-(t_{BAR}+t_{BA}+3SIFS)\}/(t_{NA}+SIFS)>k$, Block ACK is used. When $\{LT/n-(t_{BAR}+t_{BA}+3SIFS)\}/(t_{NA}+SIFS)=k$, any one of Normal ACK and Block ACK can be used.

Specifically, in the transmitting station 20, the acknowledgement-type determining unit 27 determines whether $\{LT/n-(t_{BAR}+t_{BA}+3SIFS)\}/(t_{NA}+SIFS)>k$. When $\{LT/n-(t_{BAR}+t_{BA}+3SIFS)\}/(t_{NA}+SIFS)>k$, the acknowledgement-type determining unit 27 selects Block ACK, and the transmission-data managing unit 25 transmits Block ACK Request.

As explained above, according to the present embodiment, whether Block ACK is to be used or Normal ACK is to be used is determined based on the number k of MSDUs (packets) to be acknowledged by Block ACK. Therefore, transmission efficiency can be improved.

The wireless LAN system according to the present embodiment can be applied to various communication network systems. As one example, the wireless LAN system can be optimally applied to a network system in which household electric appliances incorporate the wireless communication function and these household electric appliances are connected to each other as a household LAN. For example, the wireless LAN can be applied to the embodiment where the base station 10 is related to a set-top box that manages all wireless communication devices within the house, the transmitting station 20 is related to a DVD player as a video reproducing device and a BS/CS tuner, the receiving station 30 is related to a television as a display device, the DVD player or the BS/CS tuner transmits a video image to a television, and the set-top box manages the communication.

INDUSTRIAL APPLICABILITY

The wireless LAN system and its transmitting station according to the present invention are widely useful for a system capable of using plural kinds of transmission confirmation information, and particularly useful for wireless LAN systems using the IEEE802.11e.

The invention claimed is:

1. A wireless LAN system established by connecting a plurality of communication stations via a network, comprising:
   a first communication station, when the first communication station transmits packets to a second communication station, can select a first method in which the second communication station returns first transmission-confirmation information to the first communication station for each packet that the second communication station receives, and a second method in which the second communication station returns, in response to the request of the first communication station, second transmission-confirmation information to the first communication station for a plurality of received packets,
   the first communication station can select either one of the first method and the second method, based on a number k of packets to be acknowledged by the second transmission-confirmation information, and
   the second method is selected when $k>(tBAR+tBA+tNA+3SIFS)/(tNA+SIFS)$, where tNA represents a transmission period of the first transmission-confirmation information, SIFS represents a short frame interval, tBAR represents a transmission period of the request, and tBA represents a transmission period of the second transmission-confirmation information.

2. A wireless LAN system established by connecting a plurality of communication stations via a network, comprising:
   a first communication station, when the first communication station transmits packets to a second communication station, can select a first method in which the second communication station returns first transmission-confirmation information to the first communication station for each packet that the second communication station receives, and a second method in which the second communication station returns, in response to the request of the first communication station, second transmission-confirmation information to the first communication station for a plurality of received packets,
   the first communication station can select either one of the first method and the second method, based on a number k of packets to be acknowledged by the second transmission-confirmation information, and
   the second method is selected when $k<\{LT/n-(tBAR+tBA+tNA+3SIFS)\}/(tNA+SIFS)$, where tNA represents a transmission period of the first transmission-confirmation information, SIFS represents a short frame interval, tBAR represents a transmission period of the request, tBA represents a transmission period of the second transmission-confirmation information, LT represents a life of a packet, and n represents number of times of retransmission.

3. A transmitting station in a wireless LAN system established by connecting a plurality of communication stations connected via a network, comprising:
   the transmitting station, when the transmitting station transmits packets to a receiving station, can select a first method in which the receiving station returns first transmission-confirmation information to the transmitting station for each packet that the receiving station receives, and a second method in which the receiving station returns, in response to the request of the transmitting station, second transmission-confirmation information to the transmitting station for a plurality of received packets,
   the transmitting station can select either one of the first method and the second method, based on a number k of packets to be acknowledged by the second transmission-confirmation information, and
   the second method is selected when $k>(tBAR+tBA+tNA+3SIFS)/(tNA+SIFS)$, where tNA represents a transmission period of the first transmission-confirmation information, SIFS represents a short frame interval, tBAR represents a transmission period of the request, and tBA represents a transmission period of the second transmission-confirmation information.

4. A transmitting station in a wireless LAN system established by connecting a plurality of communication stations connected via a network, comprising
   the transmitting station, when the transmitting station transmits packets to a receiving station, can select a first method in which the receiving station returns first transmission-confirmation information to the transmitting station for each packet that the receiving station receives, and a second method in which the receiving station returns, in response to the request of the transmitting station, second transmission-confirmation information to the transmitting station for a plurality of received packets,
   the transmitting station can select either one of the first method and the second method, based on a number k of packets to be acknowledged by the second transmission-confirmation information, and
   the second method is selected when $k<\{LT/n-(tBAR+tBA+tNA+3SIFS)\}/(tNA+SIFS)$, where tNA represents a transmission period of the first transmission-confirmation information, SIFS represents a short frame interval, tBAR represents a transmission period of the request, tBA represents a transmission period of the second transmission-confirmation information, LT represents a life of a packet, and n represents number of times of retransmission.

* * * * *